US011015869B2

(12) United States Patent
Edlinger et al.

(10) Patent No.: US 11,015,869 B2
(45) Date of Patent: May 25, 2021

(54) METHOD FOR REDUCING MOLTEN RAW MATERIALS, AND DEVICE FOR CARRYING OUT SAID METHOD

(71) Applicant: SHOWA DENKO CARBON GERMANY GMBH, Meitingen (DE)

(72) Inventors: Alfred Edlinger, Bartholomaeberg (AT); Daniel Steppich, Ziemetshausen (DE)

(73) Assignee: SHOWA DENKO CARBON Germany GmbH, Meitingen (DE)

( * ) Notice: Subject to any disclaimer, the term of this patent is extended or adjusted under 35 U.S.C. 154(b) by 467 days.

(21) Appl. No.: 15/520,211

(22) PCT Filed: Nov. 24, 2015

(86) PCT No.: PCT/EP2015/077476
§ 371 (c)(1),
(2) Date: Apr. 19, 2017

(87) PCT Pub. No.: WO2016/096332
PCT Pub. Date: Jun. 23, 2016

(65) Prior Publication Data
US 2017/0314861 A1     Nov. 2, 2017

(30) Foreign Application Priority Data

Dec. 16, 2014    (DE) .......................... 102014226117.1

(51) Int. Cl.
F27D 17/00        (2006.01)
F27D 1/10         (2006.01)
(Continued)

(52) U.S. Cl.
CPC ............. *F27D 17/002* (2013.01); *C22B 5/10* (2013.01); *C22B 7/00* (2013.01); *C22B 7/02* (2013.01);
(Continued)

(58) Field of Classification Search
CPC ..... F27B 1/08; F27B 1/10; C22B 5/10; C22B 7/02; C22B 7/04; F27D 11/061; F27D 17/002
See application file for complete search history.

(56) References Cited

U.S. PATENT DOCUMENTS

| 8,568,507 | B2 | 10/2013 | Edlinger | |
| 2006/0228294 | A1* | 10/2006 | Davis | ...................... C01B 3/348 |
| | | | | 423/659 |
| 2011/0179907 | A1* | 7/2011 | Edlinger | .................. C21C 5/54 |
| | | | | 75/10.14 |

FOREIGN PATENT DOCUMENTS

| AT | 502577 B1 | 4/2008 |
| EP | 2185881 A1 | 5/2010 |

(Continued)

*Primary Examiner* — Lois L Zheng
(74) *Attorney, Agent, or Firm* — Laurence A. Greenberg; Werner H. Stemer; Ralph E. Locher

(57) ABSTRACT

A method for reducing molten raw materials, includes placing the raw materials, in a solid or molten state, on an inductively heated bed with coke pieces. The reduced melt that runs off the coke bed is collected and the waste gases are discharged. A coke bed is inwardly limited by a tube-shaped element through which the reaction gases are drawn off via a plurality of draw-off openings in the tube-shaped element. The corresponding device has a reactor for a bed with coke pieces and an induction heater with at least one induction coil. The reactor has a loading opening and a discharge opening for the treated melt. The coke bed is ring-shaped around a tube-shaped element. The material of the tube-shaped element allows inductive coupling to the induction field of the induction coil and it has draw-off openings for drawing off reaction gases from the coke bed.

8 Claims, 3 Drawing Sheets

(51) Int. Cl.
*C22B 7/04* (2006.01)
*C22B 5/10* (2006.01)
*C22B 7/02* (2006.01)
*F27B 1/08* (2006.01)
*F27B 1/10* (2006.01)
*F27D 11/06* (2006.01)
*C22B 7/00* (2006.01)

(52) U.S. Cl.
CPC .................. *C22B 7/04* (2013.01); *F27B 1/08* (2013.01); *F27B 1/10* (2013.01); *F27D 11/06* (2013.01); *Y02P 10/20* (2015.11); *Y02P 10/25* (2015.11)

(56) References Cited

FOREIGN PATENT DOCUMENTS

| WO | 2008141347 | A1 | 11/2008 |
| WO | 2010022425 | A1 | 3/2010 |

\* cited by examiner

METHOD FOR REDUCING MOLTEN RAW MATERIALS, AND DEVICE FOR CARRYING OUT SAID METHOD

BACKGROUND OF THE INVENTION

Field of the Invention

The invention relates to a method for reducing molten raw materials, in which the raw materials in a solid, molten or gaseous state are placed on a bed comprising coke pieces, which bed is inductively heated at least partially, and the reduced melt that runs off the coke bed is collected and the waste gases are discharged. The invention also relates to a device for carrying out this method, comprising a reactor for receiving a bed of coke pieces, and an induction heater comprising at least one induction coil for the induction heating of the coke bed.

The molten raw materials to be reduced are in particular ores, dusts, slags, residues from pyrolysis, gasification and combustion, melts, slurries, ESU (Elektro-Schlacken-Umschmelz [electrical slag remelt]) slag components (such as, e.g. CaO, $CaF_2$, $Al_2O_3$) and/or metal oxide glasses as well as mineral melts to be degassed.

SUMMARY OF THE INVENTION

Coke pieces in the context of this invention include in particular carbon carriers such as coke, anthracite and graphite. According to the invention said carbon carriers are advantageously mixed with highly-reactive carbon carriers such as black coal, lignite or charcoal, biomass, unloaded or loaded activated charcoal.

Dust and slag, in particular waste slag, shredder lightweight fractions, composite materials such as, for example, coated aluminium foil, steel slag as well as slag from non-ferrous metallurgy and inorganic technology contain a number of metallic oxides, in the case of steel slag the latter contains considerable amounts of heavy metal oxides.

It has already been proposed to apply liquid melts onto an appropriately reducing metal bath, in particular a ferrous bath containing dissolved carbon as the reducing agent to reduce such undesired metal oxides, in particular oxides of chromium, vanadium, molybdenum, tungsten, cobalt, manganese, lead, copper and zinc, with the reduced metals transforming into metal regulus or a gaseous phase.

However, it is for the most part necessary to use the original materials directly as melts in order to utilize the heat of the melt, if such a method is to be conducted efficiently.

Furthermore, in all such reactions the slag is in equilibrium with the metal bath and due to the conditions of equilibrium heavy metals can never be completely reduced in such a way as to keep the oxides remaining in the slag at a level below the analytical detection limit. This applies in particular to chromium and vanadium oxides, which remain in the reducing slag in quantities of at least more than 1,000 ppm.

Glasses, in particular glass melts, may only be produced as colourless product if small traces of heavy metal oxides are quantitatively removed from such glass slags, since the metal oxides give the glass its respective colour.

In this context, AT 502 577 B1 has already proposed applying solid particles and/or melts onto an at least partially inductively heated bed or a column with coke pieces, and collecting the running off reduced and/or degassed melt. Compared to known metal baths a coke bed of this kind has a much higher reduction potential, and both the melting process and the reduction are performed directly in the coke bed and/or directly on the coke pieces.

The respective frequencies are about 50 to 100 kHz, which means that the energy expended can only be applied to the outer edge of the coke bed due to the skin effect. In order to heat the coke bed sufficiently even in the middle of the packed bed, a high output is needed, since the conduction of heat through the coke from the inductively heated peripheral zone towards the centre is only very limited.

One disadvantage is the occurrence of undesirable side reactions of the gas components developing in the coke bed with the molten raw materials. The method can therefore only be used in a very limited way for the regeneration of raw materials, in particular particulates that are contaminated with heavy metals, phosphorus, alkalis (in particular lithium), dioxins, halogens, toxic organic compounds, hormones or pharmaceutical residue.

The aim of the invention is therefore to improve a method and a device of the kind mentioned above in such a way that, avoiding the disadvantages described above, solid substances and melts can be largely cleaned quantitatively of undesirable substances and in particular a number of heavy metal oxides can be eliminated to a level below the detection limit in a particularly simple and efficient manner.

According to a first aspect the method according to the invention for solving this problem mainly consists of using a coke bed that is internally limited by a pipe-shaped element, with the pipe-shaped element being heated, and the reaction gases being removed from the coke bed via a plurality of exhaust vents provided in the pipe-shaped element.

Reducing agents can be introduced together with the molten raw materials. The preferred reducing agents include coal dust, natural gas, hydrocarbons, hydrogen, carbon monoxide and/or ammonia. The reducing agent is preferably blown or suctioned into the coke bed. The coke bulk can also be used as an additional reducing agent.

Preferably, the exhaust vents pass through the wall of the pipe-shaped element and open to the inside of the pipe-shaped element.

Due to the fact that the coke bed is delimited on the inside by a pipe-shaped heatable element, it is possible to heat the coke bed not only from the outside but also from the inside. This results in a much flatter temperature gradient and the disadvantages of insufficient energy input mentioned above in connection with the skin effect are avoided.

At the same time the pipe-shaped element makes it possible to vent the reaction gases generated in the coke filling much more quickly. All other known shaft furnace concepts are currently operated exclusively either in a counter current or in direct current mode, with melt and gas flow directed either oppositely or in parallel. The present invention provides for the first time the guiding of gas perpendicular to the flow direction of the melt inside a shaft furnace design. The pipe-shaped element has a plurality of exhaust vents for this purpose, which allow the radial venting of reaction gases directly in the area where they occur, thus avoiding undesirable reactions with the molten raw materials. The direct venting of the reaction gases has the additional effect of substantially increasing the reaction capacity of the coke bed. At the same time the melt flow can be optimised significantly with regard to the throughput rate due to the reduced gas volume within the coke bulk.

Furthermore, the direct removal of the reaction gases allows a shift in the chemical equilibrium in the desired direction, which is especially advantageous in the case of components that undergo a phase change during the reaction.

It is particularly preferable that the pipe-shaped element is adapted to the geometry of the coke bed. Preferably, the pipe-shaped element has a round or rectangular cross-section or a combination of both. It is furthermore preferable that the pipe-shaped element is a body that is electrically conductive, gas-permeating and/or provided with bores and resistant to high temperatures.

The pipe-shaped element is inductively heated in an advantageous way so that the heating of the coke bed and the pipe-shaped element can be performed by the same induction heater. However, special precautions have to be taken with regard to the various coupling frequencies of the coke bed and the pipe-shaped element to the induction field of the induction heater.

Therefore, a preferred development stipulates that the induction heating provided for the induction heating of the coke bed and the pipe-shaped element is operated alternately or simultaneously with alternating currents at different frequencies. Higher frequencies are required in this process in order to inductively heat the coke bed. Lower frequencies are required in order to inductively heat the pipe-shaped element.

It was observed that the coke bed is transparent for lower frequencies, allowing the pipe-shaped element to couple with the induction field with a high degree of effectiveness. This makes it possible to achieve high temperatures of 1,900° C. and above with a high power density in the coke bed. In a preferred manner, the pipe-shaped element is made of graphite, with the graphite body possibly having a coating different from carbon on the side facing the coke bed. In particular, the surface can be siliconised, creating a wear-resistant SiC surface.

Depending on the selection of alternating current frequency for the induction heater, different grain size portions in the coke filling can be coupled. Each grain size has its ideal resonance frequency, with larger coke pieces coupling at lower frequencies than smaller coke pieces. Since the coke bed usually has a grain size distribution, the selection of the alternate current frequency heats the desired fraction of the coke bed. Varying the alternating current frequency allows a targeted coupling of the various fractions in an advantageous manner, thus ensuring an energy input across the entire radial extent of the coke bed.

In a synchronous operating mode, the low-frequency alternating current is preferably modulated with one or several higher frequencies. In an alternating operating mode, preferably two or more different alternating current frequencies are applied consecutively and alternately.

According to a preferred further development alternating current is used at least at a first and a second frequency. The first frequency is preferably 2-10 kHz. The second frequency is preferably 50-200 kHz, in particular 75-130 kHz.

The method according to the invention is suitable for the treatment of a series of problematic raw materials, especially for the regeneration of problematic particulates that are, for example, contaminated with heavy metals such as Pb, Cd, Hg or Zn.

In order to address the underlying problem of the invention, according to a further aspect with a device of the aforementioned type the invention mainly consists of the reactor being designed to receive a coke bed with a ring-shaped cross-section that is internally limited by a pipe-shaped element of the reactor, with the pipe-shaped element consisting of a material suitable for inductive coupling to the induction field of the induction coil, especially graphite, and having a plurality of exhaust vents to remove reaction gases from the coke bed.

Since the coke bed and the pipe-shaped element are coupled at differing frequencies of the induction field, according to a preferred further development the voltage supply of the induction heater comprises at least one frequency converter or frequency generator with a control unit, with the former being designed to alternately or simultaneously operate the induction heater with alternating current of different frequencies.

The control unit can be designed particularly preferably to operate the induction heater with an alternating current of at least a first and second frequency. The first frequency is preferably 2-10 kHz and the second frequency is preferably 50-200 kHz, in particular 75-130 kHz.

According to another preferred embodiment ducts for blowing reactive gases open into the coke bed.

In order to ensure the effective discharge of the reaction gases from the coke bed, it is preferably the case that the exhaust vents pass through the wall of the pipe-shaped element and open into an exhaust duct arranged or provided on the inside of the pipe-shaped element. In order to obtain consistent ventilation across the entire coke bed, it is preferably the case that the exhaust vents are distributed in an arrangement in circumferential direction across the pipe-shaped element. The exhaust vents are in particular distributed evenly. In addition, the exhaust vents can also be arranged in axial direction, i.e. distributed in the vertical direction of the coke bed. It is advantageous if the exhaust vents are arranged in a plurality of horizontal rows parallel to each other.

Particularly preferably, a device can be provided for the selective opening and closing of at least a portion of the exhaust vents. This allows the gas discharge to be adjusted in such a way that the reaction gases are discharged in at an optimal position according to the respective requirements.

In order to avoid solid or liquid components from the coke bed being discharged through the exhaust vents together with the reaction gases, according to a preferred further development the exhaust vents run diagonally upwards in the direction of the exhaust duct.

Particularly preferably, the exhaust vents have a first area with a first flow cross-section and an adjacent second area with a flow cross-section that is smaller than that of the first area. This arrangement produces a laminar flow of reaction gases in the first area of the exhaust vents, whereas a turbulent flow is obtained in the second area due to the reduction of the cross-section. The turbulent flow facilitates contact of the melted particles possibly drawn into the reaction gas with the wall of the exhaust vents and with each other. The particles that were swept up agglomerate in this case and the resulting drops flow back into the reactor room and/or the coke bed along the walls of the exhaust vents.

BRIEF DESCRIPTION OF THE SEVERAL VIEWS OF THE DRAWING

The invention is explained in more detail in the following with reference to the example embodiments shown in the drawings.

DESCRIPTION OF THE INVENTION

Figure 1:
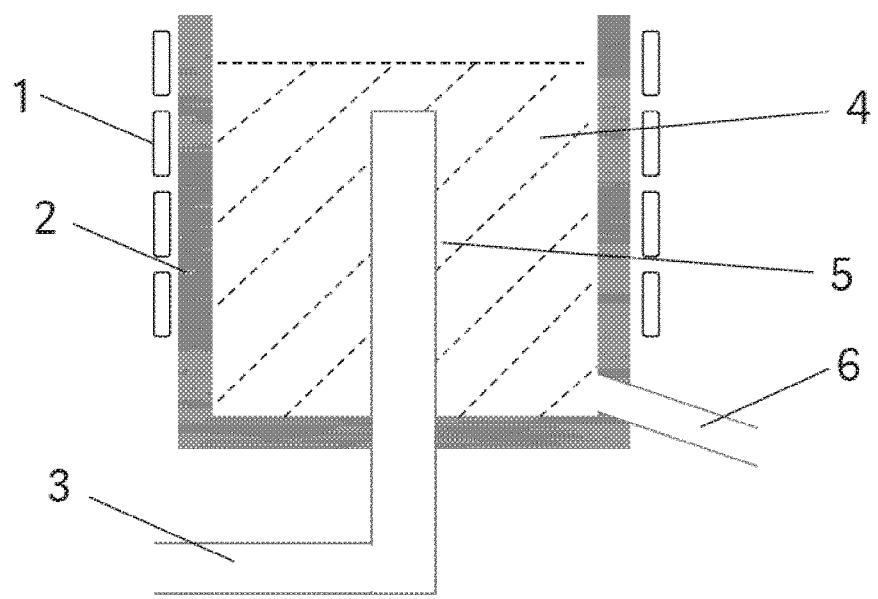
FIG. 1 shows a reactor according to the invention.

The reactor according to the invention in FIG. 1 consists of one or more induction coils 1 that are guided around the reactor wall 2. The induction coils 1 and reactor wall 2 in this case preferably have a round, coordinated cross-section. Furthermore, preferably rectangular or combinations of round and rectangular cross-sections can be used. A pipe-shaped element and a bulk material of coke pieces 4 are set into the reactor wall 2 for discharging reaction gases 3. The geometry of the pipe-shaped element for discharging reaction gases 5 is preferably coordinated with the geometry of the reactor. Solid and/or molten substances can be introduced into the inductively heated reactor. The resulting reaction gases are then discharged via the pipe-shaped element to remove the reaction gases 5 from the bulk of coke pieces 4 by means of a pressure difference towards the exit of the gas discharge duct 3. The remaining molten substances, e.g. metal melt and/or slag can, in the simplest embodiment, be directly removed from the inside of the reactor and the bulk of coke pieces 4 via a tap hole 6.

Figure 2:
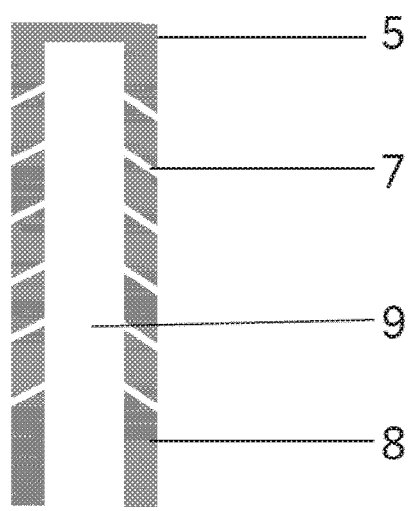
FIG. 2 a detailed view of a cross-section of the pipe-shaped element for venting the reaction gases and FIG. 3 a possible example embodiment for a bore for the intake of gas into the pipe-shaped element.

FIG. 2 shows a possible cross-section of the pipe-shaped element for discharging reaction gases 5. Bores 7 are set into the pipe wall 8 of the pipe-shaped element to discharge reaction gases 5 from the bulk of coke pieces 4. The bores are preferably arranged diagonally in such a way that they run upwards from the outside to the inside of the pipe-shaped element for the discharge of the reaction gases 5. This minimises the entry of solid or molten substances from the reactor volume of the bulk of coke pieces 4 into the interior of the pipe 9. Another embodiment of the pipe-shaped element for discharging reaction gases 5 has a modular design. In this case, any number of individual segments consisting of bores 7 and segments of the pipe wall 8 can be arranged above one other, forming the pipe-shaped element to discharge reaction gases 5. An additional embodiment of the pipe-shaped element for discharging reaction gases 5 has a modular design such that several individual segments of the pipe-shaped element for discharging reaction gases 5 are introduced parallel to each other into the bulk of coke pieces 4. Preferably, the various pipe-shaped elements for discharging reaction gases 5 have bores 7 at different levels within the bulk of coke pieces 4. This allows the reactor to be optimised in such a way that different reaction gases at different points within the bulk of coke pieces 4 can be discharged separately. Thus, different reaction zones can be defined in the bulk of coke pieces 4, from which reaction gases can be discharged independently. The definition of the various reaction zones can, for example, occur by setting various temperatures, e.g. by targeted application of reaction partners from outside the reactor wall 2 through nozzles. Another embodiment is the introduction of a pipe-shaped element to discharge reaction gases 5 consisting of several separated volumes on the inside of the pipe 9. Bores holes for different reaction zones allow a defined and independent discharge of reaction gases from the bulk of coke pieces 4 into the separated volumes on the inside of the pipe 9.

Figure 3:
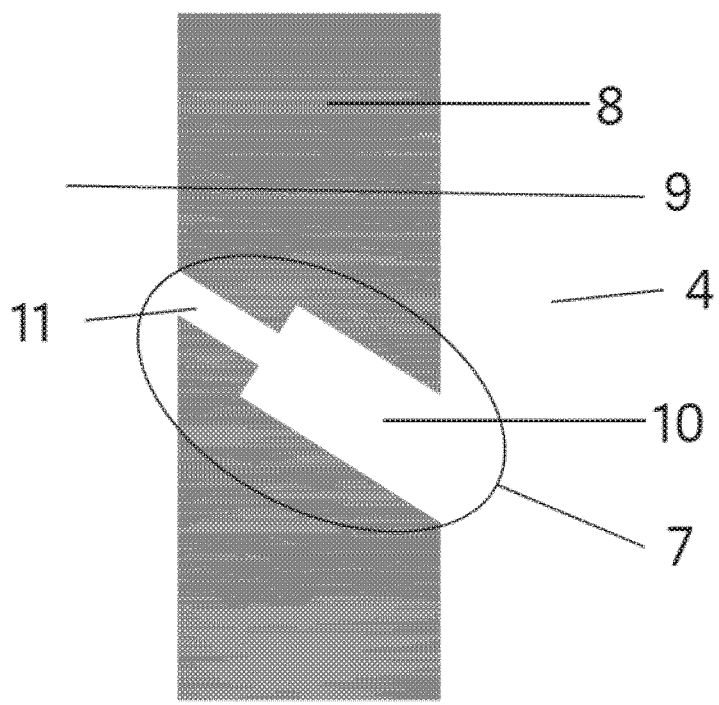

FIG. 3 is a detailed view of a possible embodiment of a bore 7 in the pipe wall 8 of the pipe-shaped element for discharging reaction gases 5. The bore 7 is preferably arranged diagonally in such a way that it runs upwards from the outside to the inside of the pipe-shaped element for discharging reaction gases 5. In addition, the bore 7 is divided into 2 segments with different dimensions. The part of the bore leading towards the exterior part 10 faces the bulk of coke pieces 4. It has a larger volume compared to the interior part of the bore 11 that leads directly to the inside of the pipe 9. Due to the higher volume of the exterior part of the bore 10, the speed of the reaction gases suctioned from the bulk of coke pieces 4 is reduced and possible solid or molten particles that are still in the flow of the gas can sink down to the underside of the outer part of the bore 10 and there flow back into the bulk of coke pieces 4. Due to the reduction of the diameter on the inside of the bore 11 compared to the outer part of the bore 10, there is a higher gas speed in the inner part of the bore 11, and preferably a turbulent mixing of the reaction gas from the bulk of coke pieces 4. Any solid or molten particles that have not been deposited in the outer part of the bore 10 preferably combine into larger particles in the turbulent zone of the inner part of the bore 11, which are then separated preferably here at the lower part of the inner part of the bore 11 and from there can flow back into the bulk of coke pieces 4. The outer part of the bore 10 can preferably be designed to be consequently rotationally symmetrical around the pipe-shaped element for discharging reaction gases 5 while the inner parts of the bore 11 are introduced at selected positions and at selected numbers into the outer part of the bore 10.

LEGEND FOR THE FIGURES

1 induction coil
2 reactor wall
3 discharge of reaction gases
4 packed bed
5 pipe-shaped element for venting reaction gases
6 tap hole
7 bores
8 pipe wall
9 pipe interior
10 exterior part of bore
11 interior part of bore

The invention claimed is:

1. A device for reducing molten raw materials, the device comprising:
    a reactor for receiving a bed of coke pieces; and
    an induction heater having at least one induction coil for the induction heating of the coke bed,
    wherein a voltage supply of said induction heater includes at least one frequency inverter or frequency generator with a control unit, and said control unit is configured for operating said induction heater alternately or simultaneously with alternating current of different frequencies,
    wherein said reactor is formed with a feed opening for the solid and molten raw materials and a tap hole for the processed melt,
    wherein said reactor is configured to receive a coke bed with a ring-shaped cross section that is delimited internally by a pipe-shaped reactor element,
    wherein said pipe-shaped reactor element is formed of a material suitable for inductive coupling with an induction field of said induction coil and has a plurality of exhaust vents for discharging reaction gases from the coke bed, and
    wherein said exhaust vents discharge the reaction gases from the coke bed and the exhaust vents run diagonally upwards in a direction of an exhaust duct.

2. The device according to claim 1, wherein said pipe-shaped element is formed of graphite.

3. The device according claim 1, wherein said control unit is configured to operate said induction heater with alternating current of at least a first and a second frequency.

4. The device according to claim 1, wherein said exhaust vents pass through a wall of said pipe-shaped element and open into an exhaust duct arranged or provided on the inside of the pipe-shaped element.

5. The device according to claim 1, wherein said pipe-shaped element is formed of graphite.

6. The device according to claim 4, wherein said exhaust vents have a first area with a first flow cross section and an adjacent second area that has a smaller flow cross section compared to the first area.

7. A device for reducing molten raw materials, the device comprising:
- a reactor for receiving a bed of coke pieces; and
- an induction heater having at least one induction coil for the induction heating of the coke bed,
- wherein said reactor is formed with a feed opening for the solid and molten raw materials and a tap hole for the processed melt,
- wherein said reactor is configured to receive a coke bed with a ring-shaped cross section that is delimited internally by a pipe-shaped reactor element,
- wherein said pipe-shaped element is formed of a material suitable for inductive coupling with an induction field of said induction coil and has a plurality of exhaust vents for discharging reaction gases from the coke bed, and
- wherein said exhaust vents are exhaust vents for discharging the reaction gases from the coke bed and the exhaust vents run diagonally upwards in a direction of an exhaust duct.

8. The device according to claim 7, wherein said pipe-shaped element is formed of graphite.

* * * * *